United States Patent
Spaeth et al.

(10) Patent No.: US 9,852,437 B2
(45) Date of Patent: *Dec. 26, 2017

(54) OPT-IN/OPT-OUT IN LOYALTY SYSTEM

(75) Inventors: Paul Spaeth, Half Moon Bay, CA (US); Bryan Shimko, Scottsdale, AZ (US); Philippe Levy, Belmont, CA (US); Liz Toibero, Laurel, MD (US); Benjamin Garton, Detroit, MI (US); Marc Black, St. Paul, MN (US); Michael Salters, Plymouth, MN (US); James Mazour, St. Louis Park, MN (US)

(73) Assignee: Visa U.S.A. Inc., San Francisco, CA (US)

( * ) Notice: Subject to any disclaimer, the term of this patent is extended or adjusted under 35 U.S.C. 154(b) by 3473 days.

This patent is subject to a terminal disclaimer.

(21) Appl. No.: 10/660,328

(22) Filed: Sep. 10, 2003

(65) Prior Publication Data

US 2004/0054591 A1    Mar. 18, 2004

Related U.S. Application Data

(60) Provisional application No. 60/410,643, filed on Sep. 13, 2002.

(51) Int. Cl.
   *G06Q 30/00*   (2012.01)
   *G06Q 30/02*   (2012.01)

(52) U.S. Cl.
   CPC ......... *G06Q 30/0226* (2013.01); *G06Q 30/02* (2013.01); *G06Q 30/0235* (2013.01)

(58) Field of Classification Search
   None
   See application file for complete search history.

(56) References Cited

U.S. PATENT DOCUMENTS

| | | |
|---|---|---|
| 3,935,933 A | 2/1976 | Tanaka et al. |
| 4,011,433 A | 3/1977 | Tateisi et al. |
| 4,108,350 A | 8/1978 | Forbes, Jr. |
| 4,124,109 A | 11/1978 | Bissell et al. |
| 4,195,864 A | 4/1980 | Morton et al. |
| 4,412,631 A | 11/1983 | Haker |
| 4,544,590 A | 10/1985 | Egan |

(Continued)

FOREIGN PATENT DOCUMENTS

| | | |
|---|---|---|
| AU | 200039412 A1 | 12/2000 |
| BE | 1002756 A6 | 5/1991 |

(Continued)

OTHER PUBLICATIONS

"Internet based secure transactions using encrypting applets and cgi-scripts Independent of browser or server capabilities"; 1998, *IBM Research Disclosure*, No. 410116, pp. 800-801.

*Primary Examiner* — Yehdega Retta
(74) *Attorney, Agent, or Firm* — Kilpatrick Townsend & Stockton LLP

(57) ABSTRACT

Techniques for changing a participation status in a loyalty program for a portable device are provided. The techniques include receiving an indication to change the participation status in the loyalty program from a first status to a second status. A parameter is modified in the portable device where the modification of the parameter corresponds to a change in the participation status in the loyalty program from the first status to the second status.

12 Claims, 5 Drawing Sheets

(56) References Cited

U.S. PATENT DOCUMENTS

| | | |
|---|---|---|
| 4,568,403 A | 2/1986 | Egan |
| 4,674,041 A | 6/1987 | Lemon et al. |
| 4,723,212 A | 2/1988 | Mindrum et al. |
| 4,742,215 A | 5/1988 | Daughters et al. |
| 4,794,530 A | 12/1988 | Yukiura et al. |
| 4,825,053 A | 4/1989 | Caille |
| 4,837,422 A | 6/1989 | Dethloff et al. |
| 4,841,712 A | 6/1989 | Roou |
| 4,868,376 A | 9/1989 | Lessin et al. |
| 4,882,675 A | 11/1989 | Nichtberger et al. |
| 4,910,672 A | 3/1990 | Off et al. |
| 4,930,129 A | 5/1990 | Takahira |
| 4,941,090 A | 7/1990 | McCarthy |
| 4,949,256 A | 8/1990 | Humble |
| 4,954,003 A | 9/1990 | Shea |
| 4,985,615 A | 1/1991 | Lijima |
| 4,992,940 A | 2/1991 | Dworkin |
| 5,019,452 A | 5/1991 | Watanabe et al. |
| 5,019,695 A | 5/1991 | Itako |
| 5,025,372 A | 6/1991 | Burton et al. |
| 5,056,019 A | 10/1991 | Schultz et al. |
| 5,060,793 A | 10/1991 | Hyun et al. |
| 5,060,804 A | 10/1991 | Beales et al. |
| 5,063,596 A | 11/1991 | Dyke |
| 5,115,888 A | 5/1992 | Schneider |
| 5,117,355 A | 5/1992 | McCarthy |
| 5,128,752 A | 7/1992 | Von Kohom |
| 5,161,256 A | 11/1992 | Lijima |
| 5,173,851 A | 12/1992 | Off et al. |
| 5,185,695 A | 2/1993 | Pruchnicki |
| 5,200,889 A | 4/1993 | Mod |
| 5,202,826 A | 4/1993 | McCarthy |
| 5,227,874 A | 7/1993 | Von Kohom |
| 5,256,863 A | 10/1993 | Ferguson et al. |
| 5,285,278 A | 2/1994 | Holman |
| 5,287,181 A | 2/1994 | Holman |
| 5,287,268 A | 2/1994 | McCarthy |
| 5,299,834 A | 4/1994 | Kraige |
| 5,308,120 A | 5/1994 | Thompson |
| 5,353,218 A | 10/1994 | De Lapa et al. |
| 5,380,991 A | 1/1995 | Valencia et al. |
| RE34,915 E | 4/1995 | Nichtberger et al. |
| 5,402,549 A | 4/1995 | Forrest |
| 5,412,192 A * | 5/1995 | Hoss ........................... 235/380 |
| 5,417,458 A | 5/1995 | Best et al. |
| 5,420,606 A | 5/1995 | Begum et al. |
| 5,450,938 A | 9/1995 | Rademacher |
| 5,466,010 A | 11/1995 | Spooner |
| 5,471,669 A | 11/1995 | Lidman |
| 5,473,690 A | 12/1995 | Grimonprez et al. |
| 5,483,444 A | 1/1996 | Heintzeman et al. |
| 5,484,998 A | 1/1996 | Bejnar et al. |
| 5,491,326 A | 2/1996 | Marceau et al. |
| 5,491,838 A | 2/1996 | Takahisa et al. |
| 5,500,681 A | 3/1996 | Jones |
| 5,501,491 A | 3/1996 | Thompson |
| 5,513,102 A | 4/1996 | Auriemma |
| 5,515,270 A | 5/1996 | Weinblatt |
| 5,530,232 A | 6/1996 | Taylor |
| 5,531,482 A | 7/1996 | Blank |
| 5,535,118 A | 7/1996 | Chumbley |
| 5,537,314 A | 7/1996 | Kanter |
| 5,559,313 A | 9/1996 | Claus et al. |
| 5,564,073 A | 10/1996 | Takahisa |
| 5,577,266 A | 11/1996 | Takahisa et al. |
| 5,577,915 A | 11/1996 | Feldman |
| 5,578,808 A | 11/1996 | Taylor |
| 5,579,537 A | 11/1996 | Takahisa |
| 5,594,493 A | 1/1997 | Nemirofsky |
| 5,612,868 A | 3/1997 | Off et al. |
| 5,621,812 A | 4/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,649,118 A | 7/1997 | Carlisle et al. |
| 5,650,209 A | 7/1997 | Ramsburg et al. |
| 5,687,322 A | 11/1997 | Deaton et al. |
| 5,689,100 A | 11/1997 | Carrithers et al. |
| 5,710,886 A | 1/1998 | Christensen et al. |
| 5,727,153 A | 3/1998 | Powell |
| 5,734,838 A | 3/1998 | Robinson et al. |
| 5,737,423 A * | 4/1998 | Manduley ...................... 705/67 |
| 5,742,845 A | 4/1998 | Wagner |
| 5,754,762 A | 5/1998 | Kuo et al. |
| 5,761,648 A | 6/1998 | Golden et al. |
| 5,765,141 A | 6/1998 | Spector |
| 5,767,896 A | 6/1998 | Nemirofsky |
| 5,774,870 A | 6/1998 | Storey |
| 5,776,287 A | 7/1998 | Best et al. |
| 5,777,305 A * | 7/1998 | Smith et al. .................. 235/380 |
| 5,791,991 A | 8/1998 | Small |
| 5,794,210 A | 8/1998 | Goldhaber et al. |
| 5,797,126 A | 8/1998 | Helbling et al. |
| 5,802,519 A | 9/1998 | De Jong |
| 5,804,806 A | 9/1998 | Haddad et al. |
| 5,806,044 A | 9/1998 | Powell |
| 5,806,045 A | 9/1998 | Biorge et al. |
| 5,815,658 A | 9/1998 | Kuriyama |
| 5,822,735 A | 10/1998 | De Lapa et al. |
| 5,822,737 A | 10/1998 | Ogram |
| 5,832,457 A | 11/1998 | O'Brien et al. |
| 5,844,218 A | 12/1998 | Kawan et al. |
| 5,845,259 A | 12/1998 | West et al. |
| 5,855,007 A | 12/1998 | Jovicic et al. |
| 5,857,175 A | 1/1999 | Day et al. |
| 5,859,419 A | 1/1999 | Wynn |
| RE36,116 E | 2/1999 | McCarthy |
| 5,865,340 A | 2/1999 | Alvem |
| 5,865,470 A | 2/1999 | Thompson |
| 5,868,498 A | 2/1999 | Martin |
| 5,880,769 A | 3/1999 | Nemirofsky et al. |
| 5,884,271 A | 3/1999 | Pitroda |
| 5,884,277 A | 3/1999 | Khosla |
| 5,884,278 A | 3/1999 | Powell |
| 5,887,271 A | 3/1999 | Powell |
| 5,890,135 A | 3/1999 | Powell |
| 5,892,827 A | 4/1999 | Beach et al. |
| 5,898,838 A | 4/1999 | Wagner |
| 5,903,732 A | 5/1999 | Reed et al. |
| 5,905,246 A | 5/1999 | Fajkowski |
| 5,905,908 A | 5/1999 | Wagner |
| 5,907,350 A | 5/1999 | Nemirofsky |
| 5,907,830 A | 5/1999 | Engel et al. |
| 5,909,486 A | 6/1999 | Walker et al. |
| 5,912,453 A | 6/1999 | Gungl et al. |
| 5,915,244 A | 6/1999 | Jack et al. |
| 5,923,884 A | 7/1999 | Peyret et al. |
| 5,924,072 A | 7/1999 | Havens |
| 5,926,795 A | 7/1999 | Williams |
| 5,928,082 A | 7/1999 | Clapper, Jr. |
| 5,931,947 A | 8/1999 | Burns et al. |
| 5,943,651 A | 8/1999 | Oosawa |
| 5,950,173 A | 9/1999 | Perkowski |
| 5,953,047 A | 9/1999 | Nemirofsky |
| 5,953,705 A | 9/1999 | Oneda |
| 5,956,694 A | 9/1999 | Powell |
| 5,956,695 A | 9/1999 | Carrithers et al. |
| 5,958,174 A | 9/1999 | Ramsberg et al. |
| 5,960,082 A | 9/1999 | Haenel |
| 5,963,917 A | 10/1999 | Ogram |
| 5,969,318 A | 10/1999 | MacKenthun |
| 5,970,469 A | 10/1999 | Scroggie et al. |
| 5,974,399 A | 10/1999 | Giuliani et al. |
| 5,974,549 A | 10/1999 | Golan |
| 5,978,013 A | 11/1999 | Jones et al. |
| 5,987,795 A | 11/1999 | Wilson |
| 5,997,042 A | 12/1999 | Blank |
| 6,000,608 A | 12/1999 | Dorf |
| 6,002,771 A | 12/1999 | Nielsen |
| 6,003,113 A | 12/1999 | Hoshino |
| 6,003,134 A | 12/1999 | Kuo et al. |
| 6,005,942 A | 12/1999 | Chan et al. |
| 6,009,411 A | 12/1999 | Kepecs |
| 6,012,635 A | 1/2000 | Shimada et al. |

(56) References Cited

U.S. PATENT DOCUMENTS

| | | |
|---|---|---|
| 6,014,634 A | 1/2000 | Scroggie et al. |
| 6,024,286 A | 2/2000 | Bradley et al. |
| 6,035,280 A | 3/2000 | Christensen |
| 6,038,551 A | 3/2000 | Barlow et al. |
| 6,041,309 A | 3/2000 | Laor |
| 6,047,325 A | 4/2000 | Jaln et al. |
| 6,049,778 A | 4/2000 | Walker et al. |
| 6,052,468 A | 4/2000 | Hillhouse |
| 6,052,690 A | 4/2000 | de Jong |
| 6,052,785 A | 4/2000 | Lin et al. |
| 6,055,509 A | 4/2000 | Powell |
| 6,061,660 A | 5/2000 | Eggleston et al. |
| 6,067,526 A | 5/2000 | Powell |
| 6,070,147 A | 5/2000 | Harms et al. |
| 6,073,238 A | 6/2000 | Drupsteen |
| 6,076,068 A | 6/2000 | DeLapa et al. |
| 6,076,069 A | 6/2000 | Laor |
| 6,089,611 A | 7/2000 | Blank |
| 6,094,656 A | 7/2000 | De Jong |
| 6,101,422 A | 8/2000 | Furlong |
| 6,101,477 A | 8/2000 | Hohle et al. |
| 6,105,002 A | 8/2000 | Powell |
| 6,105,865 A | 8/2000 | Hardesty |
| 6,105,873 A | 8/2000 | Jeger |
| 6,112,987 A | 9/2000 | Lambert et al. |
| 6,112,988 A | 9/2000 | Powell |
| 6,119,933 A | 9/2000 | Wong et al. |
| 6,119,945 A | 9/2000 | Muller et al. |
| 6,122,631 A | 9/2000 | Berbec et al. |
| 6,129,274 A | 10/2000 | Suzuki |
| 6,144,948 A | 11/2000 | Walker et al. |
| 6,151,586 A | 11/2000 | Brown |
| 6,151,587 A | 11/2000 | Matthias |
| 6,154,751 A | 11/2000 | Ault et al. |
| 6,161,870 A | 12/2000 | Blank |
| 6,164,549 A | 12/2000 | Richards |
| 6,170,061 B1 | 1/2001 | Beser |
| 6,173,269 B1 | 1/2001 | Solokl et al. |
| 6,173,891 B1 | 1/2001 | Powell |
| 6,179,205 B1 * | 1/2001 | Sloan .................... 235/382 |
| 6,179,710 B1 | 1/2001 | Sawyer et al. |
| 6,183,017 B1 | 2/2001 | Najor et al. |
| 6,185,541 B1 | 2/2001 | Scroggie et al. |
| 6,189,100 B1 | 2/2001 | Barr et al. |
| 6,189,878 B1 | 2/2001 | Dorf |
| 6,195,666 B1 | 2/2001 | Schneck et al. |
| 6,210,276 B1 | 4/2001 | Mullins |
| 6,216,014 B1 | 4/2001 | Proust et al. |
| 6,216,204 B1 | 4/2001 | Thiriet |
| 6,220,510 B1 | 4/2001 | Everett et al. |
| 6,222,914 B1 | 4/2001 | McMullin |
| 6,230,143 B1 | 5/2001 | Simons et al. |
| 6,237,145 B1 | 5/2001 | Narasimhan et al. |
| 6,241,287 B1 | 6/2001 | Best et al. |
| 6,243,687 B1 | 6/2001 | Powell |
| 6,243,688 B1 | 6/2001 | Kalina |
| 6,244,958 B1 | 6/2001 | Acres |
| 6,266,647 B1 | 7/2001 | Fernandez |
| 6,267,263 B1 | 7/2001 | Emoff et al. |
| 6,269,158 B1 | 7/2001 | Kim |
| 6,279,112 B1 | 8/2001 | O'Toole, Jr. et al. |
| 6,282,516 B1 | 8/2001 | Giuliani |
| 6,292,785 B1 | 9/2001 | McEvoy et al. |
| 6,292,786 B1 | 9/2001 | Deaton et al. |
| 6,296,191 B1 | 10/2001 | Hamann et al. |
| 6,298,336 B1 * | 10/2001 | Davis et al. .................... 705/41 |
| 6,299,530 B1 | 10/2001 | Hansted et al. |
| 6,321,208 B1 | 11/2001 | Barnett et al. |
| 6,385,723 B1 | 5/2002 | Richards |
| 6,390,374 B1 | 5/2002 | Carper et al. |
| 6,480,935 B1 | 11/2002 | Carper et al. |
| 6,505,772 B1 * | 1/2003 | Mollett et al. ................ 235/379 |
| 6,549,773 B1 | 4/2003 | Linden et al. |
| 6,549,912 B1 | 4/2003 | Chen |
| 6,612,490 B1 | 9/2003 | Herrendoerfer et al. |
| 6,651,186 B1 | 11/2003 | Schwabe |
| 6,681,995 B2 | 1/2004 | Sukeda et al. |
| 6,689,345 B2 | 2/2004 | Jager Lezer |
| 6,736,317 B1 * | 5/2004 | McDonald et al. .......... 235/384 |
| 6,763,463 B1 * | 7/2004 | Guthery ....................... 713/193 |
| 7,032,047 B2 * | 4/2006 | DiRaimondo et al. ....... 710/200 |
| 2002/0002468 A1 | 1/2002 | Spagna et al. |
| 2002/0076051 A1 | 6/2002 | Nii |
| 2002/0102975 A1 * | 8/2002 | Allen ........................... 455/435 |
| 2002/0139844 A1 * | 10/2002 | Rochman et al. ............ 235/380 |
| 2003/0052864 A1 * | 3/2003 | Sert et al. ..................... 345/173 |
| 2003/0085272 A1 * | 5/2003 | Andrews et al. ............ 235/380 |

FOREIGN PATENT DOCUMENTS

| | | |
|---|---|---|
| CA | 2293944 | 8/2000 |
| CA | 2267041 | 9/2000 |
| CA | 2317138 A1 | 1/2002 |
| DE | 19522527 A1 | 1/1997 |
| DE | 19848712 A1 | 4/2000 |
| DE | 19960978 A1 | 8/2000 |
| DE | 10015103 A1 | 10/2000 |
| EP | 0203424 A2 | 12/1986 |
| EP | 0292248 A2 | 11/1988 |
| EP | 0475837 A1 | 3/1992 |
| EP | 0540095 A1 | 5/1993 |
| EP | 0658862 A2 | 6/1995 |
| EP | 0675614 A1 | 10/1995 |
| EP | 0682327 A2 | 11/1995 |
| EP | 0875841 A2 | 11/1998 |
| EP | 0936530 A1 | 8/1999 |
| EP | 0938050 A2 | 8/1999 |
| EP | 0938051 A2 | 8/1999 |
| EP | 0944007 A2 | 9/1999 |
| EP | 0949595 A2 | 10/1999 |
| EP | 0982692 A2 | 3/2000 |
| EP | 0984404 A2 | 3/2000 |
| EP | 1085395 A2 | 3/2001 |
| EP | 1102320 A1 | 5/2001 |
| EP | 1111505 A1 | 6/2001 |
| EP | 1113387 A2 | 7/2001 |
| EP | 1113407 A2 | 7/2001 |
| EP | 1168137 A1 | 1/2002 |
| EP | 1233333 A1 | 8/2002 |
| FR | 2772957 A1 | 6/1999 |
| FR | 2793048 A1 | 11/2000 |
| FR | 2794543 A1 | 12/2000 |
| FR | 2796176 A1 | 1/2001 |
| FR | 2804234 A1 | 7/2001 |
| GB | 2331381 A | 5/1999 |
| GB | 2343091 A | 4/2000 |
| GB | 2351379 A | 12/2000 |
| GB | 2355324 A | 4/2001 |
| JP | 2000-112864 A | 4/2000 |
| JP | 2000-181764 A | 6/2000 |
| JP | 2001-202484 A | 7/2001 |
| JP | 2001-236232 A | 8/2001 |
| KR | 0039297 A | 5/2001 |
| KR | 0044823 A | 6/2001 |
| KR | 0058742 A | 7/2001 |
| KR | 0021237 A | 3/2002 |
| WO | WO 90/16126 A1 | 12/1990 |
| WO | WO 96/25724 A1 | 8/1996 |
| WO | WO 96/38945 A1 | 12/1996 |
| WO | WO 96/42109 A1 | 12/1996 |
| WO | WO 97/05582 A1 | 2/1997 |
| WO | WO 97/10562 A1 | 3/1997 |
| WO | WO 97/39424 A1 | 10/1997 |
| WO | WO 98/02834 A1 | 1/1998 |
| WO | WO 98/09257 A1 | 3/1998 |
| WO | WO 98/20465 A1 | 5/1998 |
| WO | WO 98/43169 A2 | 10/1998 |
| WO | WO 98/43212 A1 | 10/1998 |
| WO | WO 98/52153 A2 | 11/1998 |
| WO | WO 99/10824 A1 | 3/1999 |
| WO | WO 99/16030 A1 | 4/1999 |
| WO | WO 99/19846 A2 | 4/1999 |
| WO | WO 99/44172 A1 | 9/1999 |
| WO | WO 99/45507 A1 | 9/1999 |

(56) References Cited

FOREIGN PATENT DOCUMENTS

| | | |
|---|---|---|
| WO | WO 99/49415 A2 | 9/1999 |
| WO | WO 99/49426 A1 | 9/1999 |
| WO | WO 00/39714 A1 | 7/2000 |
| WO | WO 00/46665 A2 | 8/2000 |
| WO | WO 00/54507 A1 | 9/2000 |
| WO | WO 00/57315 A2 | 9/2000 |
| WO | WO 00/57613 A1 | 9/2000 |
| WO | WO 00/62265 A1 | 10/2000 |
| WO | WO 00/62472 A1 | 10/2000 |
| WO | WO 00/67185 A1 | 11/2000 |
| WO | WO 00/68797 A1 | 11/2000 |
| WO | WO 00/68902 A1 | 11/2000 |
| WO | WO 00/68903 A1 | 11/2000 |
| WO | WO 00/69183 A2 | 11/2000 |
| WO | WO 00/75775 A2 | 12/2000 |
| WO | WO 00/77750 A1 | 12/2000 |
| WO | WO 01/04851 A1 | 1/2001 |
| WO | WO 01/06341 A1 | 1/2001 |
| WO | WO 01/08087 A1 | 2/2001 |
| WO | WO 01/13572 A1 | 2/2001 |
| WO | WO 01/15397 A1 | 3/2001 |
| WO | WO 01/18633 A1 | 3/2001 |
| WO | WO 01/18746 A1 | 3/2001 |
| WO | WO 01/29672 A1 | 4/2001 |
| WO | WO 01/33390 A2 | 5/2001 |
| WO | WO 01/40908 A2 | 6/2001 |
| WO | WO 01/42887 A2 | 6/2001 |
| WO | WO 01/44900 A2 | 6/2001 |
| WO | WO 01/44949 A2 | 6/2001 |
| WO | WO 01/47176 A1 | 6/2001 |
| WO | WO 01/50229 A2 | 7/2001 |
| WO | WO 01/52575 A1 | 7/2001 |
| WO | WO 01/55955 A1 | 8/2001 |
| WO | WO 01/59563 A1 | 8/2001 |
| WO | WO 01/61620 A1 | 8/2001 |
| WO | WO 01/65545 A2 | 9/2001 |
| WO | WO 01/67694 A1 | 9/2001 |
| WO | WO 01/71648 A2 | 9/2001 |
| WO | WO 01/71679 A2 | 9/2001 |
| WO | WO 01/73530 A2 | 10/2001 |
| WO | WO 01/73533 A1 | 10/2001 |
| WO | WO 01/78020 A1 | 10/2001 |
| WO | WO 01/80563 A1 | 10/2001 |
| WO | WO 01/84377 A2 | 11/2001 |
| WO | WO 01/84474 A2 | 11/2001 |
| WO | WO 01/84512 A1 | 11/2001 |
| WO | WO 01/88705 A1 | 11/2001 |
| WO | WO 02/06948 A1 | 1/2002 |
| WO | WO 02/10962 A1 | 2/2002 |
| WO | WO 02/14991 A2 | 2/2002 |
| WO | WO 02/15037 A1 | 2/2002 |
| WO | WO 02/21315 A1 | 3/2002 |
| WO | WO 02/29577 A2 | 4/2002 |
| WO | WO 02/088895 A2 | 11/2002 |

\* cited by examiner

OPT-IN/OPT-OUT IN LOYALTY SYSTEM

CROSS-REFERENCES TO RELATED APPLICATIONS

This U.S. non-provisional application claims the benefit of the filing dates of U.S. provisional patent application No. 60/410,643, filed Sep. 13, 2002. This provisional application is herein incorporated by reference in its entirety for all purposes.

BACKGROUND OF THE INVENTION

The present invention generally relates to financial transactions and more specifically to a system and method for changing participation status in a loyalty program on a portable device.

With the continuing demand for using information to provide an enhanced consumer experience, acceptance point (e.g., point of sale) devices and portable devices may be leveraged to provide a personalized experience for a customer during a purchase transaction at a merchant. For example, a loyalty program may be provided where customers are awarded incentives for shopping at certain merchants participating in the loyalty program. As part of the loyalty program, consumers are issued portable devices to enable a consumer to participate in the loyalty program.

The portable device generally can be used for various purposes. For example, the portable device can be used for purposes related to program participation, such as participation in a loyalty program, as well as other purposes. For a portable device that is used in connection with a loyalty program, such device typically includes a loyalty module that includes hardware, software, or any combination thereof, that communicates with an acceptance point device when any transactions with the portable device are desired. The portable device can be, for example, a smartcard. In addition to the loyalty module, the portable device may also include other modules, information and data that are not related to a loyalty program.

Under conventional practice, when a portable device with the loyalty module is issued, the participation status of the consumer is permanently set to active, i.e., the consumer is automatically opted into the loyalty program. As a result, since the participation status cannot be changed, the consumer will always participate in the loyalty program offered by the issuer of the portable device. If the consumer desires to change his or her participation status, the consumer will then have to be issued a new portable device with a new loyalty module and the participation status set to not active. Accordingly, when a consumer uses the new portable device, the consumer will not be eligible to participate in any loyalty programs. Therefore, whenever a consumer desires to change his or her participation status in a loyalty program, the consumer is issued a new portable device with a new loyalty module.

Issuing a new portable device every time a consumer wants to change his or her participation status has many disadvantages. For example, for the issuer perspective, it is very costly to issue a new portable device every time a user desires to change his or her participation status. Moreover, the reissue of new portable devices for every status change impacts rate of participation, since consumers might not want to participate in a loyalty program if the consumer has to have a new portable device issued every time a change in participation status is desired. Thus, the benefits of providing loyalty programs are compromised because consumers may become less willing to participate in any loyalty programs due to the inconvenience involved.

Hence, it would be desirable to provide a method and system that is capable of efficiently facilitating changing of a consumer's participation status in a loyalty program.

BRIEF SUMMARY OF THE INVENTION

Techniques for changing a participation status in a loyalty program for a portable device are provided by embodiments of the present invention. The techniques include receiving an indication to change the participation status in the loyalty program from a first status to a second status. A parameter is modified in the portable device where modification of the parameter corresponds to a change in the participation status in the loyalty program from the first status to the second status.

In an exemplary embodiment, the techniques may be used for an acceptance point device and/or a networked computing device.

In an exemplary embodiment, the techniques include receiving card image data from the portable device. The card image data includes the parameter. The parameter is then modified to indicate the second status. The modified card image data, including the changed parameter, is then transmitted to the portable device, thereby changing the participation status in the portable device from the first status to the second status. Modification of the card image data can be initiated in a number of ways including, for example, initiation either by a host or a cardholder.

In an exemplary embodiment, a method for changing a participation status in a loyalty program for a portable device is provided. The method comprises: receiving an indication to change the participation status in the loyalty program from a first status to a second status; and modifying a parameter in the portable device, the modification of the parameter corresponding to a change in the participation status in the loyalty program from the first status to the second status. The change from the first status to the second status represents either opting into or opting out of participation in the loyalty program. Participation in the loyalty program can be further divided into different levels. These different levels include, for example, account level, card level, program level and transaction level.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 1:
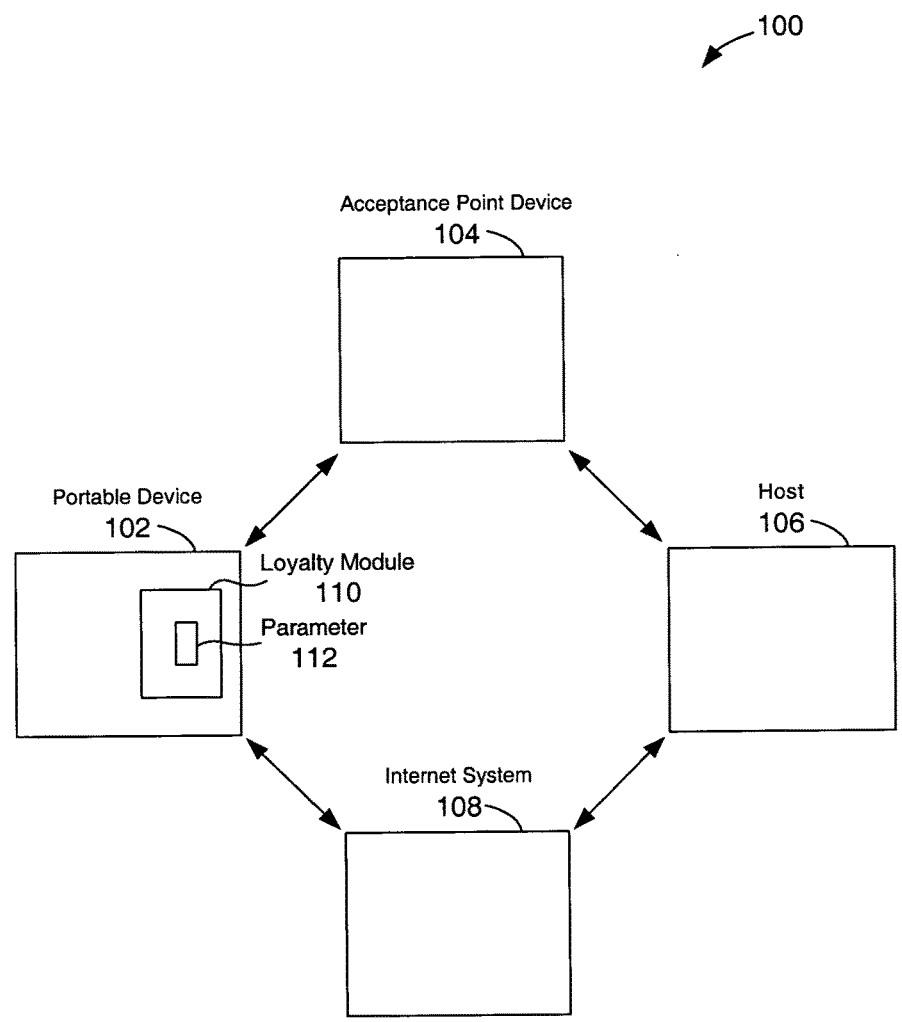
FIG. 1 depicts a simplified block diagram of a loyalty system for changing a participation status in a loyalty program according to one embodiment of the present invention.

The present invention in the form of one or more exemplary embodiments will now be described. FIG. 1 depicts a simplified block diagram of a loyalty system 100 for changing a participation status in a loyalty program according to one embodiment of the present invention. System 100 includes a portable device 102, an acceptance point device 104, a host 106, and an Internet system 108.

Portable device 102 is a device that can communicate with acceptance point device 104 and/or Internet system 108. For example, portable device 102 may be a smart card, cellular phone, personal digital assistant (PDA), pager, payment card (such as a credit card and an ATM card), security card, access card, smart media, transponder and the like. Portable device 102 includes a loyalty module 110 that is configured to enable the consumer using portable device 102 to participate in one or more loyalty programs. Loyalty module 110 includes hardware, software, or any combination thereof, that is used in communications with acceptance point device 104 and/or Internet system 108 and enables participation in any loyalty programs. In an exemplary embodiment, loyalty module 110 may be a computer chip that includes a software applet which enables portable device 102 to participate and handle transactions in one or more loyalty programs.

Loyalty module 110 includes card image data. The card image data includes parameter 112. Parameter 112 is used to determine a consumer's participation status in one or more loyalty programs. Also, the card image data may include other information, such as information that is used to allow loyalty transactions to be processed and/or enable participation in loyalty programs. In an exemplary embodiment, parameter 112 may indicate whether portable device 102 is opted into or out of certain loyalty programs.

Participation in the loyalty program can be further divided into different levels. In one example, the participation status as represented by parameter 112 may reflect whether the cardholder of portable device 102 is eligible to participate at an account level. In some instances, the cardholder may be eligible to participate in one or more loyalty programs and these loyalty programs are linked to one account. If the cardholder opts out at the account level, the cardholder is not eligible to participate in loyalty program(s) associated with the account.

In a second example, the participation status may reflect whether the cardholder is eligible to participate at a card level. In some instances, the cardholder may have one or more portable devices that can be used to participate in loyalty programs. Each portable device may be associated with one or more loyalty programs. If the cardholder opts out at the card level, the cardholder is prevented from using a particular portable device to participate in loyalty program(s) associated with that particular portable device.

In another example, the participation status may reflect whether the cardholder is eligible to participate at a program level. In some instances, the cardholder may be eligible to participate in one or more loyalty programs. If the cardholder opts out at the program level, the cardholder is not eligible to participate in one or more designated loyalty programs.

In yet another example, the participation status may reflect whether the cardholder is eligible to participate at a transaction level. If the cardholder opts out at the transaction level, the cardholder is not eligible to participate in a specific type of transaction associated with the loyalty program. A variety of criteria, or combinations thereof, can be used to identify transactions that do not qualify for participation by the cardholder including, for example, payment level, time of transaction, and type of goods or services associated with the transaction. For instance, if the cardholder opts out at the transaction level based on payment level, the cardholder is rendered ineligible to participate in transactions meeting a predetermined payment threshold.

Based on the disclosure and teachings provided herein, a person of ordinary skill in the art will know how to create and maintain different levels of participation in accordance with the present invention. By using parameter 112 to represent different levels of participation, a number of other functions can also be provided in connection with portable device 102. For example, in addition to allowing opting in and out of a loyalty program, access blocking and reissuance of portable device 102 can be managed.

In an exemplary embodiment, acceptance point device 104 is a device associated with a merchant. For example, acceptance point device 104 can be a point of sale (POS) device, a cellular phone, a personal digital assistant (PDA), a hand-held specialized reader (e.g., smartcard key tabs), a set-top box, a kiosk, a personal computer (PC), a tablet PC, an electronic cash register, a virtual cash register, a security system, an access system, and the like. Acceptance point device 104 is able to communicate with portable device 102. More specifically, for purposes related to a loyalty program, acceptance point device 104 communicates with loyalty module 110. In one illustrative communication, card image data is communicated from portable device 102 to acceptance point device 104 when portable device 102 is connected with acceptance point device 104. Upon receiving the card image data from portable device 102, acceptance point device 104 may modify the participation status by modifying parameter 112 in the card image data. By modifying parameter 112, acceptance point device 104 effectively changes the participation status for the consumer of portable device 102. The card image data, including the modified parameter 112, is then communicated back to portable device 102 and stored on loyalty module 110. Once parameter 112 has been changed, the participation status of portable device 102 is also changed. As described above, the card image data is communicated to acceptance point device 104. However, it should be understood that the card image data need not be communicated to acceptance point device 104. For example, acceptance point device 104 may access and change the card image data while the data still resides in portable device 102. Alternatively, parameter 112 can be modified independently without having to retrieve and forward the card image data from portable device 102.

Internet system 108 includes a computing device that is attached to a network, such as the Internet, a wireless network, a wireline network, and the like. In an exemplary embodiment, Internet system 108 includes a personal computer, workstation, PDA, cellular phone, set-top box connected to a television, kiosk, tablet PC, and the like. Internet system 108 provides a graphical user interface (GUI) for a user of portable device 102 to interact with Internet system 108. For example, the user may utilize the GUI to designate the participation status with respect to a loyalty program in an ad hoc and flexible manner and/or view other status information in connection with the loyalty program.

In an exemplary embodiment, Internet system 108 includes a card reader that can be used to communicate with portable device 102. Once portable device 102 is connected to the card reader, the card image data is communicated from portable device 102 to Internet system 108. Upon receiving the card image data, Internet system 108 may modify parameter 112 to change the participation status for portable device 102. The card image data is then communicated back to portable device 102 and stored in loyalty module 110. Effectively, the participation status for portable device 102 is changed with the modification of parameter 112.

Host 106 is a central entity that controls the participation of portable device 102 in all loyalty programs offered through system 100. The change in participation status can be initiated in a number of ways, for example, either by the cardholder of portable device 102 or host 106. In one illustrative situation, the cardholder of portable device 102 or a customer service agent contacted by the cardholder can initiate the change via either acceptance point device 104 or Internet system 108. Whenever any change in participation status is implemented in acceptance point device 104 or Internet system 108, the change is sent to host 106. Host 106 then stores the changed participation status for the applicable portable device 102. In an exemplary embodiment, the changed participation status may be communicated to host 106 in real-time or changes may be accumulated and communicated to host 106 in certain intervals, such as daily. Furthermore, in an alternative embodiment, host 106 may also initiate a change participation status request which is affected through either acceptance point device 104 or Internet system 108. For example, host 106 may be responsible for managing a loyalty program and may under certain conditions need to deactivate one or more loyalty program participants vis-à-vis their portable device.

Figure 2:
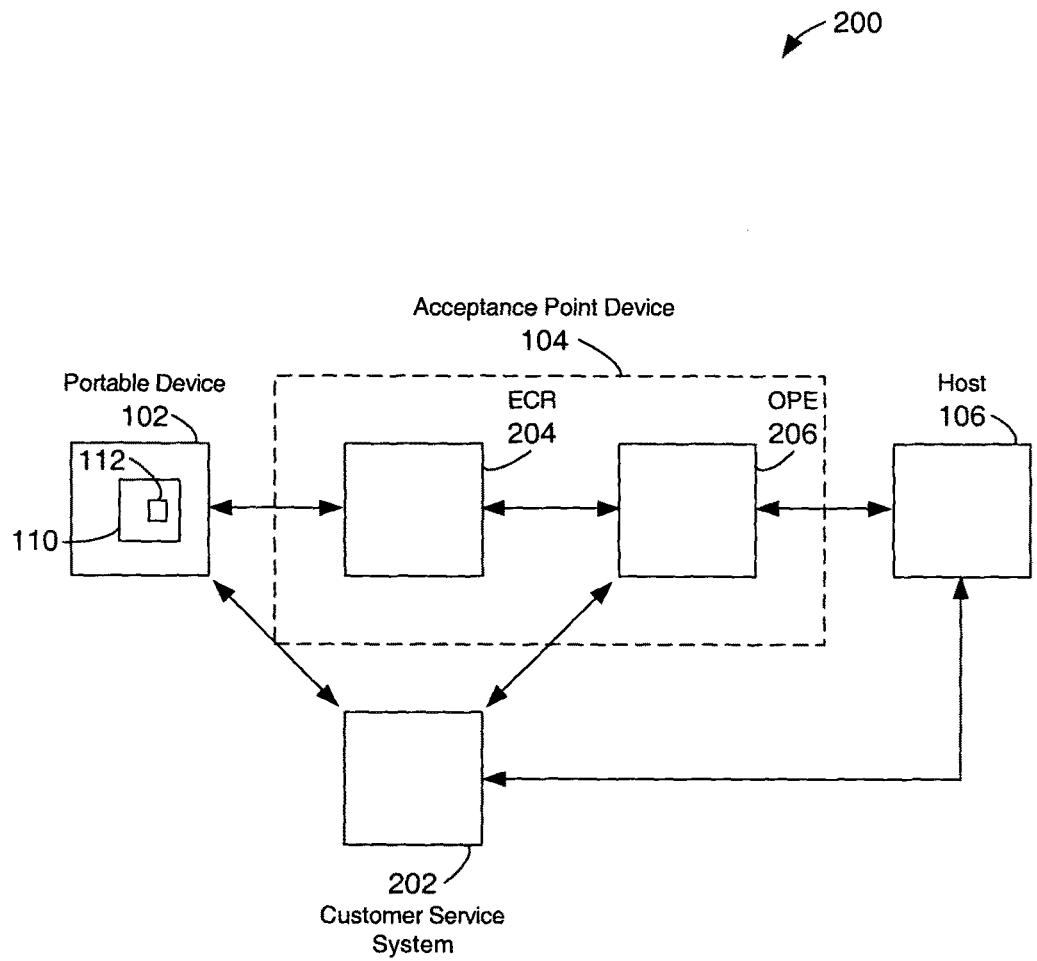
FIG. 2 depicts a simplified block diagram for changing a participation status for a portable device using an acceptance point device according to one embodiment of the present invention.

FIG. 2 depicts a simplified block diagram 200 for changing a participation status for portable device 102 using acceptance point device 104 according to one embodiment of the present invention. In an exemplary embodiment, portable device 102, acceptance point device 104, host 106, and a customer service system (CSS) 202 are provided. Acceptance point device 104 is connected to host 106 through a networked connection, such as the Internet, a wireless network, a wireline network, and the like.

Acceptance point device 104 includes an electronic cash register (ECR) 204 and open program engine (OPE) 206. ECR 204 is configured to communicate with portable device 102 and, more specifically, loyalty module 110. ECR 204 is also configured to communicate with OPE 206. OPE 206 is configured to modify parameter 112 to change the participation status for portable device 102. OPE 206 is also configured to communicate any participation status changes with host 106. In one exemplary embodiment, the acceptance point device 104 (including ECR 204 and OPE 206) is equipped to handle transactions corresponding to different loyalty programs. The OPE 206 includes software components that are dedicated to corresponding loyalty programs. Although ECR 204 and OPE 206 are described, it should be understood that ECR 204 and OPE 206 may be combined into a single module or split into any number of modules.

Customer service system 202 may also initiate a change participation status request with portable device 102. CSS 202 may include a customer service representative that is using a computing device connected to OPE 206 or to host 106. Also, in an exemplary embodiment, CSS 202 may include a card reader that is configured to receive and communicate with portable device 102. The card reader receives card image data and sends the data to OPE 206. OPE then modifies parameter 112 and sends the modified card image data back to CSS 202. CSS 202 then modifies the card image data in portable device 102.

In another embodiment, CSS 202 may receive identification information for portable device 102. In this case, CSS 202 uses the identification information to change the participation status in host 106. Then, when portable device 102 is subsequently inserted into acceptance point device 104 or Internet system 108, parameter 112 will be updated to indicate the changed participation status. When portable device 102 is subsequently updated, any process described above and below may be used.

Figure 3:
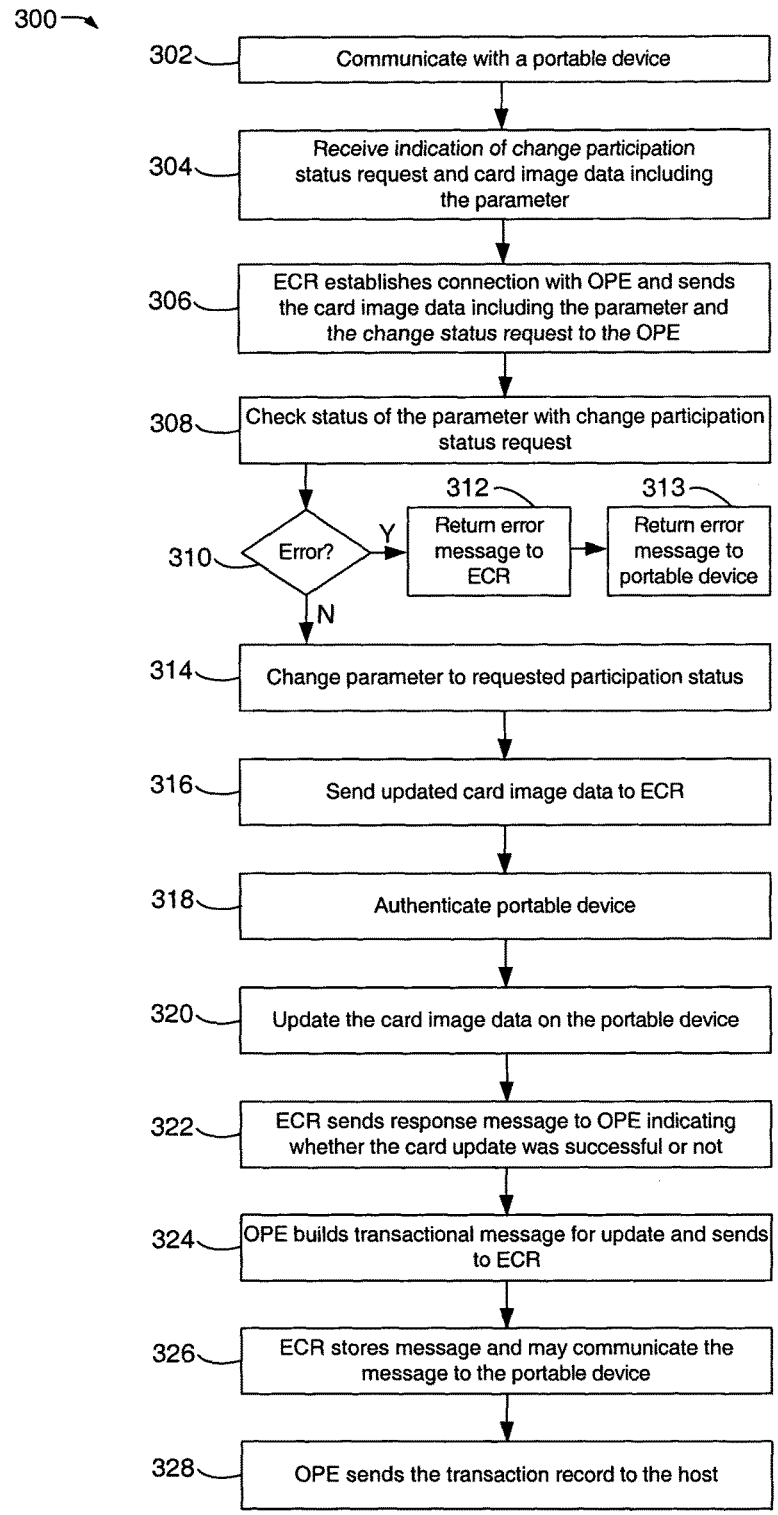
FIG. 3 is a flowchart illustrating a method for changing a participation status for a portable device using an acceptance point device according to one embodiment of the present invention.

FIG. 3 is a flowchart 300 illustrating a method for changing a participation status for portable device 102 using acceptance point device 104 according to one embodiment of the present invention. The method will be described with reference to FIGS. 1 and 2.

In step 302, acceptance point device 104 communicates with portable device 102. In an exemplary embodiment, portable device 102 may be inserted into acceptable point device 104. Also, portable device 102 may communicate with acceptance point device 104 through a wireless or wireline connection.

Once a connection between portable device 102 and acceptance point device 104 is established, an indication that a change in participation status is received at acceptance point device 104. The indication may be generated by a user of portable device 102 inputting his/her request using a keypad associated with acceptance point device 104. As described above, the participation status may be specified according to different levels.

In step 304, ECR 204 receives the change participation status request and also receives the card image data from loyalty module 110 of portable device 102. As mentioned above, the card image data includes parameter 112, which indicates the participation status for portable device 102.

In step 306, ECR 204 establishes a connection with OPE 206 and sends the card image data containing parameter 112 to OPE 206. Additionally, ECR 204 sends the change participation status request to OPE 206. For example, the consumer may have chosen to opt-out of or opt-in to one or more loyalty programs at the program level. OPE 206 uses the appropriate software components corresponding to the relevant loyalty program(s) to handle the transaction accordingly.

In step 308, OPE 206 checks the current status of parameter 112 with the change participation status request to determine if the request is valid in light of the current status indicated by parameter 112. If the status of parameter 112 is active, then a request to change the status to active is not allowed. Similarly, if the status of parameter 112 is inactive, then a request to change the status to inactive is not allowed.

In step 310, OPE 206 determines if the request is valid. In step 312, if the request is not valid, OPE 206 returns an error message to ECR 204. ECR 204 then returns the error message to portable device 102 in step 313. ECR 204 may also indicate to the user that the submitted request is not valid.

In step 314, if no error was found, OPE 206 changes parameter 112 to an indication that reflects the requested participation status. For example, parameter 112 is changed to an active indication if the request was for opting into a loyalty program and changes parameter 112 to an inactive indication if the request was for opting out of a loyalty program.

The error checking described above can be alternatively viewed as checking for redundancy. If the request is consistent with the current status of parameter 112, then no action is taken to effect the request. For example, if the status of parameter 112 is active, then a request to change the status to active would be redundant; hence, the request will not be effected. If it is determined that the request is redundant, then OPE 20b promptly relays the appropriate message to portable device 102.

In step 316, OPE 206 sends the updated card image data to ECR 204. In step 318, ECR 204 authenticates portable device 102.

In step 320, ECR 204 updates the card image data in portable device 102 using the updated card image data received from OPE 206. Specifically, parameter 112 is updated in portable device 102.

In step 322, ECR 204 sends a response message to OPE 206 that indicates whether the card update was successful or unsuccessful. OPE 206 then builds a transaction record that indicates whether the participation status update was successful or not. In step 324, the transaction record is sent to ECR 204. ECR 204 then stores the transaction record and may communicate the transaction record to portable device 102 in step 326.

In step 328, OPE 206 sends the transaction record for the status change to host 106. As mentioned above, OPE 206 may accumulate transactions and send them to host 106 at certain intervals, such as once per day.

CSS 202 may also be used to change the participation status for portable device 102. If portable device 102 can communicate with CSS 202, then the above method depicted in FIG. 3 may be used. If portable device 102 cannot communicate directly with CSS 202, then CSS 202 receives identification information with respect to portable device 102 via other means, such as, a customer service representative obtaining the relevant information from a user of portable device 102 over the telephone. Identification information may be a social security number, name, device identification for portable device 102, etc. CSS 202 then communicates with OPE 206 or host 106 to change the participation status for portable device 102. The change request is logged in OPE 206 or host 106 and next time portable device 102 is connected to acceptance point device 104 or Internet system 108, the above method depicted in FIG. 3 may be used to update portable device 102. When the participation status is changed in this latter manner, a request to change status is not required. Parameter 112 will be updated automatically next time portable device 102 is inserted into acceptance point device 104.

Figure 4:
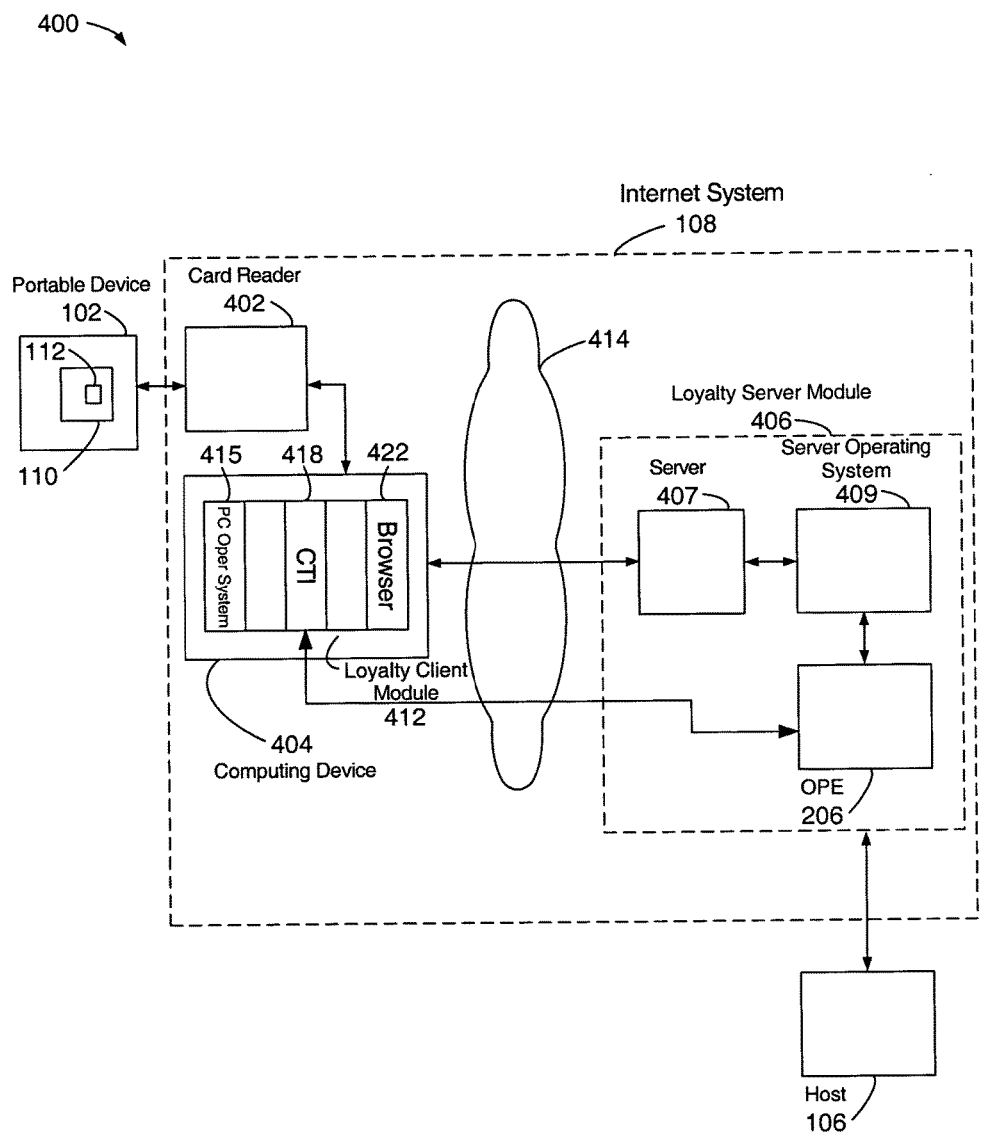
FIG. 4 depicts a simplified block diagram for changing a participation status using an Internet system according to one embodiment of the present invention.

FIG. 4 depicts a simplified block diagram 400 for changing a participation status using Internet system 108 according to one embodiment of the present invention. Internet system 108 includes a card reader 402, a computing device 404, a communication medium 414, and a loyal server module (LSM) 406.

Computing device 404 communicates with card reader 402 and includes loyalty client module 412. Computing device 404 may be any computing device, such as a personal computer (PC), workstation, personal digital assistant (PDA), pocket PC, cellular telephone, card reader, set top box, tablet PC, and the like. Computing device 404 can communicate with portable device 102 and receive card image data including parameter 112 from loyalty module 110 via card reader 402. For example, portable device 102 may be inserted into card reader 402 or portable device 102 may communicate with card reader 402 through a wireless connection or wireline connection. When card reader 402 establishes a connection with portable device 102, card image data from portable device 102 can then be uploaded. Card reader 402 then communicates the card image data to computing device 404. Loyalty client module 412 includes software components that enable the computing device 404 to communicate directly with the card reader 402 and, through the card reader 402, with the portable device 102 and loyalty module 110. In addition, the loyalty client module 412 enables the computing device 404 to communicate with the loyalty server module 406. In an exemplary embodiment, the loyalty client module 412 includes one or more cardholder transaction interface "CTI" applications 418 that operate in conjunction with a web browser 422 and a PC operating system 415 to perform the functions of reading and writing data or a card image to portable device 102, displaying a GUI interface to the cardholder for purposes of managing the process of opting in or opting out of the loyalty program, and delivering the card image and opt in and opt out information to and from the loyalty server module 406. The loyalty server module 406 facilitates communications with the loyalty client module 412 and the loyalty host 106. Loyalty server module 406 is any computing device that conducts communications with computing device 404. In an exemplary embodiment, the loyalty server module 406 includes a web server application 407 and an open programming engine application (OPE) 206 operating in conjunction with a server operating system 409 to perform the functions of receiving and sending card image data to and from the loyalty client module 412, delivering GUI pages and scripts to the loyalty client module 412 that enable the cardholder to manage the opt in and opt out status of his/her participation in the loyalty program and communicate with the portable device 102, and recording and delivering the opt in and opt out status of a cardholder to the loyalty host 106.

Communications between the loyalty client module 412 and the loyalty server module 406 occur across the communication medium 414. The communication medium 414 can be a private network or a public network such as the Internet. These communications could be secure or unsecure, authenticated or unauthenticated. In an exemplary embodiment, these communications would be performed using authentication of both the loyalty client module 412 and the loyalty server module 406 across an encrypted communications channel. Loyalty client module 412, and more specifically, the CTI 418, authenticates portable device 102, and receives and sends the card image data from portable device 102 including parameter 112 to loyalty server module (LSM) 406 and more specifically, OPE 206. Loyalty server module 406 modifies the card image data, including parameter 112, and sends the card image data to the loyalty client module 412 and records the change in status on loyalty host 106. When the updated card image data is received from loyalty server module 406, loyalty client module 412 updates the card image data in portable device 102.

As described above, loyalty server module 406, specifically OPE 206, is configured to receive the card image data including parameter 112 from computing device 404 and change the status of parameter 112 to the requested status. OPE 206 then returns the updated card image data to computing device 404 in order to upload the updated card image data to portable device 102. OPE 206 may also send a transaction record to host 106 indicating the status change if it was successful.

Figure 5:
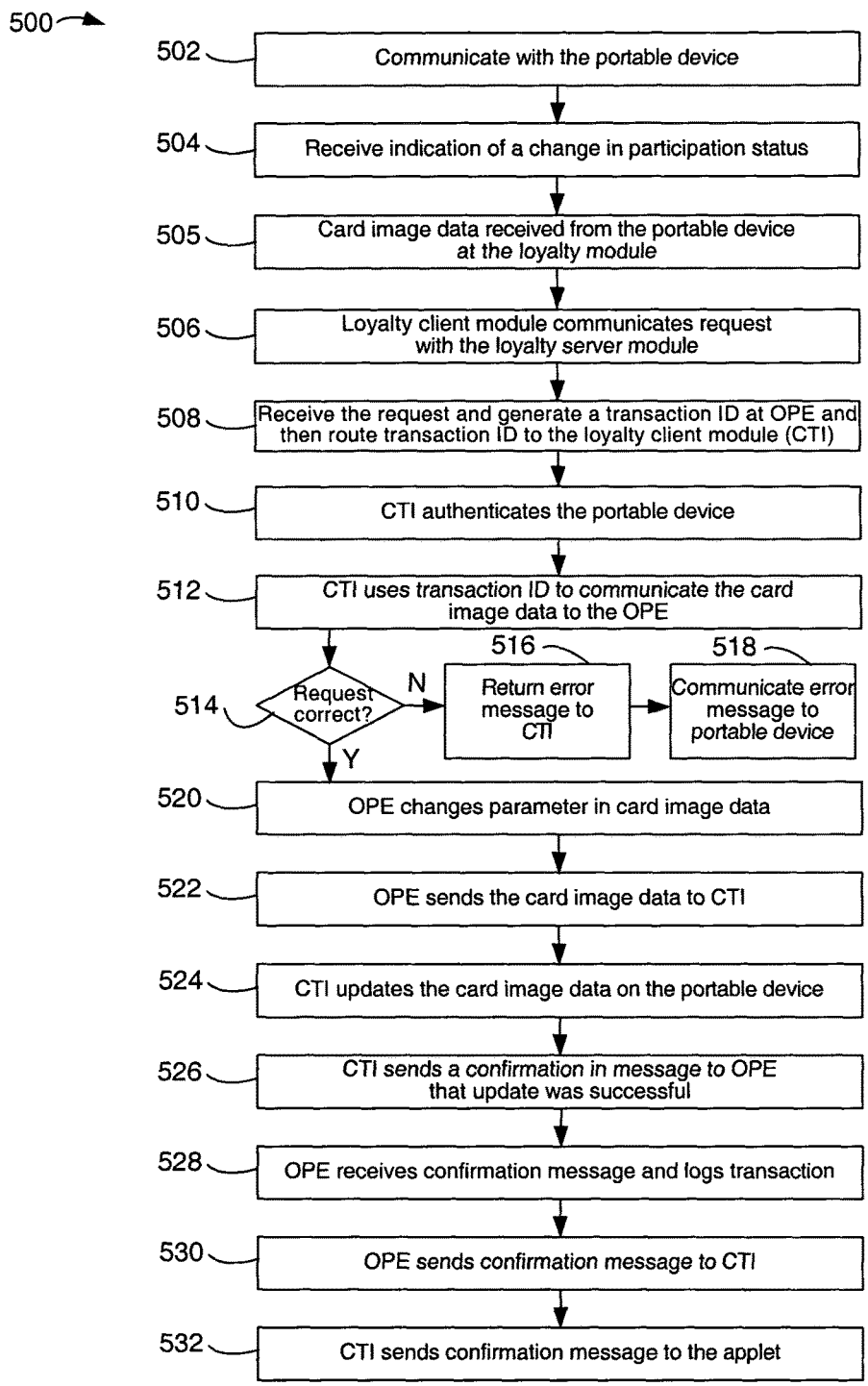
FIG. 5 is a flowchart illustrating a method for changing a participation status of a portable device using an Internet system according to one embodiment of the present invention.

FIG. 5 is a flowchart 500 illustrating a method for changing a participation status of portable device 102 using Internet system 108 according to one embodiment of the present invention. In step 502, the user of portable device 102 establishes a connection with card reader 402. The connection may be through a wireless connection, wireline connection, or the like.

In step 504, an indication is received at computing device 404 that a change in participation status for portable device 102 is requested. In an exemplary embodiment, the user may be browsing the Internet using browser 422 and send a command using browser 422 indicating the request for a change in participation status. For example, the user may indicate that s/he wants to opt-in or opt-out of a particular loyalty program.

In step 505, card image data from portable device 102 is received at loyalty module 412.

In step 506, loyalty client module 412 communicates with loyalty server module 406 and indicates that a change participation status request has been received.

In step 508, loyalty server module 406, specifically OPE 206, receives the change participation status request and generates a transaction ID. The transaction ID is then routed to loyalty client module 412, specifically CTI 418, which invokes a change participation status operation.

In step 510, CTI 418 authenticates portable device 102.

In step 512, CTI 418 uses the transaction ID to communicate with OPE 206. In an exemplary embodiment, CTI 418 sends a response message that includes the transaction ID and a requested operation to change participation status to OPE 206. Additionally, the card image data from loyalty module 110 including parameter 112 is sent to OPE 206.

In step 514, OPE 206 determines if the change participation status request is valid. For example, if the status of portable device 102 is active, the change participation status request may be for changing the status to inactive.

In step 516, if the change participation status request is invalid, OPE 206 returns an error message to CTI 418. CTI 418 can then communicate the error message to portable device 102 in step 518.

In step 520, if the request is valid, OPE 206 changes parameter 112 in the card image data. For example, parameter 112 is changed from an active status to an inactive status if the request was for opting out of a loyalty program or is changed from an inactive status to an active status if the request was for opting in to a loyalty program.

In step 522, OPE 206 sends the updated card image data back to CTI 418.

In step 524, CTI 418 updates the card image data on portable device 102 using the modified card image data. In an exemplary embodiment, CTI 408 overwrites the old card image data with the modified card image data in portable device 102. Thus, parameter 112 has been updated in loyalty module 110 to change the status as was requested in the change participation status request.

In step 526, CTI 418 sends a confirmation request message to OPE 206. The message indicates that the update was successful. In step 528, OPE 206 receives the confirmation request and logs the change participation status request transaction in its logs. OPE 206 then sends a confirmation message back to CTI 418 in step 530. CTI 418 then sends the confirmation to applet 420 in step 532. The update process is then complete.

Accordingly, the embodiments of the present invention allow a user using a portable device to opt-in and opt-out of one or more loyalty programs. The portable device includes a parameter that can be changed when a request for opting in or opting out of a loyalty program is received. Loyalty programs may also be opted in and opted out of on a selected basis. For example, loyalty programs offered by a certain merchant, sponsor, or issuer may be opted in or opted out of on a selective basis. Additionally, loyalty programs that are offered through the Internet or loyalty programs that are offered through acceptance point devices may be opted in or opted out of on a selective basis.

It should be understood that while the foregoing description is provided in connection with a loyalty program, the present invention is not limited to such application. For example, the present invention can be deployed in other applications where program participation is to be managed. Based on the teachings and disclosure provided herein, a person of ordinary skill in the art will know of other ways and/methods to deploy the present invention.

In an exemplary embodiment, system 100 as described above is implemented using a number of hardware and/or software components. It should be understood that in addition to the configurations described above, these components may be distributed in other manners, integrated or modular or otherwise, amongst the various components of system 100 to achieve the same collective functionality, depending on factors such as the system design and resource constraints. For example, the various components of loyalty client module 412 can be combined or re-distributed in computing device 404; and likewise, the same can be achieved with various components of loyalty server module 406. Based on the disclosure and teachings provided herein, a person of ordinary skill in the art will know of other ways and/or methods to implement the functionality provided by the present invention in various forms and/or configurations.

It should further be understood that the present invention as described above can be implemented in software, hardware, or a combination of both, in the form of control logic in a modular or integrated manner. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for changing a participation status in a loyalty program for a portable device, after the portable device has been activated, the method comprising:
receiving from a loyalty client computing device, by an Internet system comprising an open program engine comprising software components that are dedicated to loyalty programs, a request from a loyalty program participant that is a user of the activated portable device, which is an activated portable consumer device, using a graphical user interface for changing the participation status in the loyalty program associated with the activated portable device from a first loyalty program participation status to a second loyalty program participation status, wherein the first status is an opt-out status associated with the loyalty program and the second status is an opt-in status associated with the loyalty program;

generating, by the Internet system, a transaction identification (ID) and sending the transaction ID to the loyalty client computing device;

receiving, by an Internet system, a response message from the loyalty client computing device that includes the transaction ID, a requested operation to change participation status and card image data from the activated portable device, the card image data including a parameter indicating the loyalty program participation status as having the first loyalty program participation status, and information that allows loyalty transactions to be processed;

modifying the parameter in the card image data received from the activated portable device, using the Internet system, the modification of the parameter corresponding to a change of the participation status from the first loyalty program participation status to the second loyalty program participation status;

sending the modified card image data to the loyalty client computing device wherein the card image data is updated in the activated portable device with the modified parameter using the modified card image data by overwriting the existing card image data with the modified card image data in the portable device, the modified parameter indicating the participation status as having the second loyalty program participation status;

receiving a confirmation request message indicating that the update was successful; and logging the change participation status and sending a confirmation message to the loyalty client computing device.

2. The method of claim 1, further comprising establishing a connection with the activated portable device to allow the card image data to be received.

3. The method of claim 1, further comprising sending an indication to a host indicating that the parameter in the activated portable device was modified.

4. The method of claim 3, wherein logging the change participation status includes changing a record for the status of the activated portable device to the second status at the Internet system.

5. The method of claim 1, wherein the participation status includes one of a plurality of levels.

6. The method of claim 5, wherein the plurality of levels include an account level, a card level, a program level and a transaction level.

7. The method of claim 1, wherein the activated portable device comprises at least one of a smartcard, a cellular phone, a personal digital assistant (PDA), a pager, a payment card, a security card, an access card, smart media and a transponder.

8. A system for changing a participation status in a loyalty program for a portable device, after the portable device has been activated, the system comprising:

a networked computing device configured to communicate with the activated portable device, the networked computing device comprising:

an electronic cash register and an open program engine comprising software components that are dedicated to loyalty programs;

means for establishing a connection with the activated portable device;

means for receiving a request directly from a loyalty program participant that is a user of the activated portable device, which is an activated portable consumer device, using a graphical user interface for changing the participation status in the loyalty program associated with the activated portable device from a first loyalty program participation status to a second loyalty program participation status, wherein the first status is an opt-out status associated with the loyalty program and the second status is an opt-in status associated with the loyalty program;

means for receiving card image data from the activated portable device, the card image data including a parameter indicating the participation status as having the first loyalty program participation status for the activated portable device and information to be used to allow loyalty transactions to be processed;

means for sending an indication that a change participation status request has been received;

means for receiving a transaction identification (ID);

means for sending a response message that includes the transaction ID, a requested operation to change participation status and the card image data including the parameter;

means for updating the card image data in the activated portable device with the modified parameter using the modified card image data by overwriting the existing card image data with the modified card image data in the portable device, the modified parameter indicating the participation status as having the second loyalty program participation status; and means for sending a confirmation request message indicating that the update was successful;

a loyalty server module component configured to communicate with the networked computing device and receive the sent card image data, wherein the loyalty server module comprises:

an open program engine comprising software components that are dedicated to loyalty programs;

means for receiving the change participation status request;

means for generating a transaction identification (ID) and sending the transaction ID to the network computing device;

means for modifying the parameter in the card image data received from the activated portable device, the modification of the parameter corresponding to a change of the participation status from the first loyalty program participation status to the second loyalty program participation status; and means for sending the modified card image data received from the activated portable device, to the networked computing device.

9. The system of claim 8, wherein the networked computing device further comprises:

means for communicating through a network to establish a connection with the loyalty server module; and means for using the transaction ID to connect to the loyalty server module through the network.

10. The system of claim 8, wherein the networked computing device further comprises means for sending an indication to a host indicating that the parameter in the activated portable device was modified.

11. The system of claim 8, wherein the activated portable device comprises at least one of a smartcard, a cellular phone, a personal digital assistant (PDA), a pager, a payment card, a security card, an access card, smart media and a transponder.

12. The method of claim 1 further comprising:
   determining, by the Internet system, whether the change participation status is valid; and
   based on a determination that the change participation status is valid, modifying the image in the card image data received from the activated portable device.

\* \* \* \* \*